No. 639,279. Patented Dec. 19, 1899.
E. C. PECK.
METAL WORKING TOOL.
(Application filed July 13, 1899.)
(No Model.)
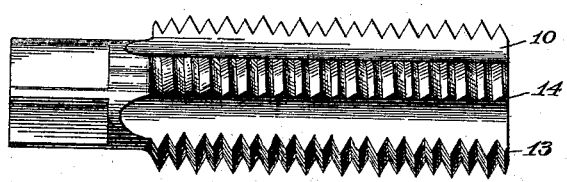
Fig. 1.
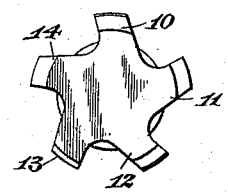
Fig. 2.
Fig. 3.
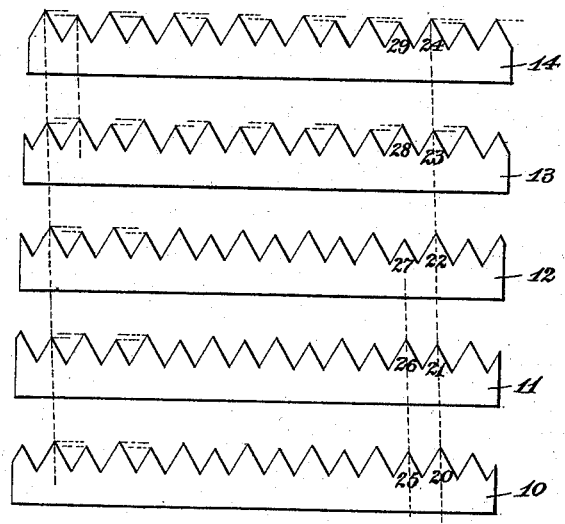

Witnesses:
Chas. F. Schmelz
Geo. F. Hoffman.
Inventor
E. C. Peck,
By his Attorney
F. H. Richards.
THE NORRIS PETERS CO., PHOTO-LITHO., WASHINGTON, D. C.

UNITED STATES PATENT OFFICE.

EUGENE C. PECK, OF MANSFIELD, MASSACHUSETTS, ASSIGNOR TO THE S. W. CARD MANUFACTURING COMPANY, OF SAME PLACE.

METAL-WORKING TOOL.

SPECIFICATION forming part of Letters Patent No. 639,279, dated December 19, 1899.

Application filed July 13, 1899. Serial No. 723,702. (No model.)

*To all whom it may concern:*

Be it known that I, EUGENE C. PECK, a citizen of the United States, residing in Mansfield, in the county of Bristol and State of Massachusetts, have invented certain new and useful Improvements in Metal-Working Tools, of which the following is a specification.

This invention relates to an improvement in cutting-tools employed for forming either external or internal angular sections in metal, and has for its object the provision of a tool of the class mentioned whereby such angular sections may be made of a precisionized form and with sharp crowns, and the essential features of which may be adapted to tools for various purposes—as, for instance, to taps, dies, hobbing-cutters and chasers, as well as to tools which may be used in connection with a planer or other machine.

This invention is primarily intended to be applied to a thread-cutting tool—a tap or a die—which will produce threads the tops of which are sharp; but it is distinctly to be understood that it is not limited thereto.

Figure 4:
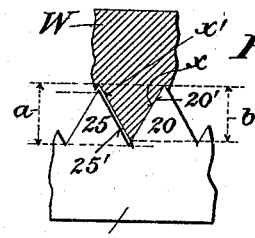

In the accompanying drawings, in which like characters designate like parts in the various views, Figure 1 is a side view of a tap made in accordance with my invention. Fig. 2 is an end view of the same. Fig. 3 illustrates the several rows or sections of cutting-teeth of the tap shown in Figs. 1 and 2. Fig. 4 is a detail view, on an enlarged scale, illustrating the manner in which the cutting-tooth of the tap first operates on one side of the work; and Fig. 5 is a similar view illustrating the manner in which the other side of the work is operated upon by the succeeding cutting-tooth.

Heretofore in all devices of this character with which I am familiar the sharpness of the tops of the threads produced in the work is made to depend on the shape of the bottom of the space between two cutting-teeth of the tool, whereas in my invention the sharpness of the tops of the angular sections cut in the work is produced by single cutting-surfaces of the teeth of the tool, each of which acts only once upon the angular section being formed.

The tap illustrated is provided with five sections or rows of teeth 10 11 12 13 14, (although other uneven numbers of rows may be employed,) the particular form of which may be best seen by referring to Fig. 4, in which W designates the work and 10 a part of one of the rows of teeth above mentioned. The tooth 20 of this row is shown operating on the side $x$ of the angular section or thread to be produced, the cutting edge 20' of said tooth extending from top to bottom thereof and being greater in length than said side $x$. Hence it will be seen that the distance from the top of the cutting-tooth 20 to the bottom thereof (such distance being indicated by the line $a$ in Fig. 4) is greater than the distance from the top of the thread produced in the work to the bottom of said thread, as indicated by the line $b$. The actual pitch of the cutting-teeth, or, in other words, the distance between the centers thereof longitudinally of the tap, will, however, remain the same. While the main portion of the tooth 20 will cut the full depth of the thread or convolution, the root of said tooth will be located below the crown or top of the thread being formed, the adjacent tooth 25 of the tool being relieved at its side to leave a clearance-space between the edge 25' and the side $x'$ of the thread. It will thus be seen that at no time is the top of the thread being formed in contact with any part of the tool, and therefore the cutting edge 20' will act like a knife and shave the side $x$, thus forming at the top of the thread in the work a slight bur or fin turned in the direction of the tooth 25, which fin will be received in the clearance-space between said tooth and the thread. As the tap is turned the tooth 21 of row 11 will follow in the path of the tooth 20 of row 10, and the tooth 26 of said row 11 will follow the tooth 25 of row 10, the latter condition being shown in Fig. 5 of the drawings, in which it will be seen that the tooth 21 is relieved at its sides, so as to leave a clearance-space between the edge $x$ of the thread and the tooth 21, while, on the other hand, the tooth 26 is formed full, and the cutting edge 26' thereof will operate on the side $x'$ of the thread, thereby trimming off the bur which had previously been formed at the crown of the thread and toward the right thereof and now forming a slight bur toward the right, which will be received in the space between the tooth 21 and the side $x'$ of the thread. The tooth 22 of row 12, succeeding the tooth 21, will again be formed full, while the adjacent tooth 27 of said row will be relieved, and the succeeding teeth 28, 29, &c., of the rows 13 and 14 will be alternately formed full and relieved, so that in the present instance and on account of the uneven number of rows of cutter-teeth said full and relieved teeth will also alternate in each individual row. By the means described the thread will be alternately operated upon first on one side and then on the other, and in this manner a sharp crown or apex thereof will be produced.

Figure 5:
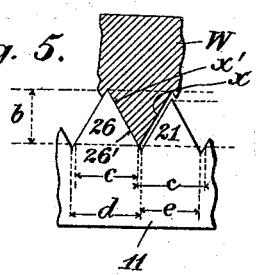

When it is remembered, as above stated, that the distance from center to center of the teeth longitudinally of the tool will be the same throughout its entire length, the distance from crown to crown of the thread produced in the work, as indicated by $c$ in Fig. 5, will of course be the same; but inasmuch as every other tooth of the tool is relieved and the cutting edges of the adjacent teeth are lengthened until they meet the roots of the relieved teeth it follows that the length of base of said cutting-teeth will be greater than the base of a relieved tooth, as indicated by $d$ and $e$, Fig. 5, a circumstance which in itself does not affect the thread being cut, because the crown thereof does not extend to the roots of the teeth in the tool.

Although the teeth 21 23 25, &c., are relieved as above described and are therefore rendered non-cutting, they serve to brush out chips and dirt from the grooves formed by the preceding cutting-teeth and also to carry a film of oil through each groove in advance of the succeeding cutting-tooth. Another and very important purpose subserved by the so-called "non-cutting teeth" is that their sides will act as backing supports for limiting any undue crowding over or displacement of the thread in being cut, and said sides will also serve to trim off any bur or fin projecting from the thread being formed far enough to be reached by them and will therefore aid in this manner the primary cutting-teeth in bringing the thread to a precisionized form with a sharp point. It is well known that the thread, and especially the crown thereof, is apt in some cases to be displaced or crowded over to one side by the cutting operation upon the opposite side, and more especially so if the particular cutting-tooth should not possess the required degree of sharpness or should the metal be unusually tough. The amount of "relief" of these teeth, and consequently the spaces between the work and the relieved teeth, being in practice of small dimensions, it follows that the bur cannot become large and that the succeeding tooth will readily trim off the same without tearing or breaking the metal.

In forming the cutting-teeth of a tap or analogous tool in the manner above described all friction incidental to some of the teeth being non-cutting, and therefore in a measure burnishing the threads by a constant drag on the sides of the thread, will be entirely obviated, so that I am not only enabled to produce a thread which may, according to the nature of the material in which it is cut, even be brought to a knife-edge, but, furthermore, a great deal of power required heretofore on account of the difficulties presented will be saved.

It is of course obvious that the cutting-teeth may be arranged and formed in a planer-tool as well as in a tap, and I am in this manner enabled to produce a surface in metal which contains a series of precisionized and sharp-edged projections or ribs by a single traverse of the planer-table, as will be readily understood.

Having thus described my invention, I claim—

1. A cutting-tool having working teeth of greater length than the length of the teeth to be cut in the stock, said working teeth being constructed respectively to operate on alternate sides of successive teeth of the stock, and said tool also having a series of teeth of less height and less width at their bases than the working teeth.

2. A metal-cutting tool embodying a series of cutting-teeth having their cutting edges alternating in consecutive teeth and of greater length than that of the work to be cut, said tool also having a series of teeth of less height and less width at their bases than the cutting-teeth, the pitch of all of the teeth of the tool being the same.

3. A screw-cutting tool embodying a series of cutting-teeth and a series of intermediate teeth of less height and of less width at their bases than the cutting-teeth, both the cutting and the intermediate teeth being of the same pitch, and the cutting-teeth being of greater dimensions than the roots of the thread to be cut.

4. A screw-cutting tap having an odd number of lands, each land being equipped with a series of cutting-teeth of greater dimensions than the roots of the thread to be cut, and also having a series of teeth intermediate said cutting-teeth of less height and less width at their bases than said cutting-teeth, both the cutting and the intermediate teeth being of the same pitch and adapted to operate substantially as set forth.

EUGENE C. PECK.

Witnesses:
CHAS. C. HAGERTY,
ALFRED B. DAY.